US011887115B2

(12) United States Patent
Stollman et al.

(10) Patent No.: US 11,887,115 B2
(45) Date of Patent: Jan. 30, 2024

(54) SYSTEMS AND METHODS TO VALIDATE TRANSACTIONS FOR INCLUSION IN ELECTRONIC BLOCKCHAINS

(71) Applicants: Jeff Stollman, Wayne, PA (US); Martin Mateev, Varna (BG)

(72) Inventors: Jeff Stollman, Wayne, PA (US); Martin Mateev, Varna (BG)

(*) Notice: Subject to any disclaimer, the term of this patent is extended or adjusted under 35 U.S.C. 154(b) by 51 days.

(21) Appl. No.: 15/488,925

(22) Filed: Apr. 17, 2017

(65) Prior Publication Data

US 2019/0130394 A1 May 2, 2019

(51) Int. Cl.
*G06Q 40/00* (2023.01)
*G06Q 20/38* (2012.01)
*G06F 16/23* (2019.01)
*H04L 9/06* (2006.01)
*H04L 9/32* (2006.01)
*H04L 9/00* (2022.01)

(52) U.S. Cl.
CPC ....... *G06Q 20/389* (2013.01); *G06F 16/2365* (2019.01); *G06F 16/2379* (2019.01); *H04L 9/0637* (2013.01); *H04L 9/3239* (2013.01); *H04L 9/50* (2022.05); *H04L 2209/56* (2013.01)

(58) Field of Classification Search
CPC .. G06Q 20/389; G06Q 40/02; G06F 16/2379; G06F 16/2365; H04L 9/0637; H04L 2209/38; H04L 2209/56
See application file for complete search history.

(56) References Cited

U.S. PATENT DOCUMENTS

| 7,599,884 | B2* | 10/2009 | van Leeuwen | G06Q 40/02 705/39 |
| 9,959,398 | B1* | 5/2018 | Blair | H04L 63/08 |
| 10,304,143 | B2* | 5/2019 | Kasper | H04L 63/123 |
| 10,530,859 | B1* | 1/2020 | Todd | H04L 67/1097 |
| 10,579,974 | B1* | 3/2020 | Reed | G06Q 20/065 |
| 11,386,404 | B2* | 7/2022 | Thomas | G06Q 20/401 |

(Continued)

FOREIGN PATENT DOCUMENTS

WO  WO-2018091066 A1 *  5/2018  ........... G06F 21/577

OTHER PUBLICATIONS

Michele D'Aliessi, How Does the Blockchain Work?, Jun. 1, 2016, Medium (Year: 2016).*

(Continued)

*Primary Examiner* — Edward J Baird

(57) ABSTRACT

A system for validating the integrity of blockchain transactions prior to such transactions being added to the electronic blockchain using, in part, an automated, protocol-based methodology is disclosed. Use of such a system circumvents current costly consensus mechanisms for validating transactions prior to inclusion onto the underlying electronic blockchain. In a preferred embodiment, the disclosed system may be implemented within blockchain environments where the transacting parties "trust" each other where trust may be evidenced in different ways. In such an example, the system provides an automated, protocol-based validation of transactions that have been approved by the transacting parties, such that record of the validated transaction may be appended to a blockchain.

15 Claims, 4 Drawing Sheets

(56) References Cited

U.S. PATENT DOCUMENTS

| | | | |
|---|---|---|---|
| 2009/0198617 A1* | 8/2009 | Soghoian | G06Q 20/04 |
| | | | 705/65 |
| 2015/0356555 A1* | 12/2015 | Pennanen | G06Q 20/389 |
| | | | 705/71 |
| 2017/0187535 A1* | 6/2017 | Middleton | H04L 9/3247 |
| 2017/0212781 A1* | 7/2017 | Dillenberger | G06F 9/5038 |
| 2017/0243209 A1* | 8/2017 | Johnsrud | H04L 12/14 |
| 2017/0317833 A1* | 11/2017 | Smith | G06Q 20/3829 |
| 2018/0039667 A1* | 2/2018 | Pierce | G06Q 20/0658 |
| 2018/0096163 A1* | 4/2018 | Jacques de Kadt | G06Q 40/02 |
| 2018/0145836 A1* | 5/2018 | Saur | G06Q 20/3829 |
| 2018/0165612 A1* | 6/2018 | Saxena | G06N 20/00 |
| 2018/0276625 A1* | 9/2018 | Saye | G06Q 20/3825 |
| 2018/0293363 A1* | 10/2018 | Asati | G06F 21/64 |

OTHER PUBLICATIONS

Milutinovic et al: "Proof of Luck: an Efficient Blockchain Consensus Protocol", SysTEX '16: Proceedings of the 1st Workshop on System Software for Trusted Execution, Dec. 2016 (Year: 2016).*

* cited by examiner

SYSTEMS AND METHODS TO VALIDATE TRANSACTIONS FOR INCLUSION IN ELECTRONIC BLOCKCHAINS

FIELD OF THE INVENTION

The present invention generally relates to the field of blockchain validation. The process, often referred to as a consensus process, validates the integrity of new transactions, the electronic blocks that the new transactions may be consolidated into before being added to a blockchain, and further validates the integrity of the resulting updated blockchain. More particularly, the present invention relates to systems implemented within blockchain environments where the transacting parties "trust" each other, where trust may be one or more of (a) knowledge of the other parties, (b) trust in available recourse should the transaction not be completed as intended, or (c) ability to verify the accuracy and completeness of the transaction prior to validation of the transaction, such that an automated, protocol-based validation of transactions operates to verify new transactions prior to being appended to an electronic blockchain.

BACKGROUND DESCRIPTION AND REVIEW OF CERTAIN PRIOR ART

An objective of cryptocurrency protocols such as Bitcoin is to maintain a live transaction ledger capable of defending against double-spend attacks from a malicious *Byzantine Generals* attack by actors who may wish to deviate from the accepted protocol. See Lamport, L.; Shostak, R.; Pease, M. (1982), "*The Byzantine Generals Problem*" and "*ACM Transactions on Programming Languages and Systems*." In order to support the anonymity (more accurately, pseudonymity) of transacting parties while avoiding the hegemony of having an "owner" of the ledger, Bitcoin employs a decentralized validation process wherein consensus of the Bitcoin transaction ledger is secured by a network of miners. These miners are incentivized to participate in the consensus process through a schedule of rewards for providing consensus confirmation relating to blocks to be appended to the blockchain.

The work of the miners, or the mining, includes a proof-of-work calculation that is designed to be so difficult and resource complex, as to make it costly for any one miner—or attacker—to create multiple accounts to attempt to gain control of, or divert the blockchain. By way of example, at current Bitcoin prices and reward schedule, miners are rewarded approximately $1,500,000 each day to secure the blockchain. It has been noted that a significant portion of that money is spent solely on electricity to power the necessary processing of the proof-of-work calculations. In view of the increasing complexity of calculations necessary to establish consensus, in part being a function of the history and size of the Bitcoin blockchain, proof-of-work based consensus protocols are slow, requiring up to an hour to reasonably confirm a payment to prevent double-spending. See Jae Kwon, "Tendermint: Consensus Without Mining," Draft V0.6, http://tendermint.com/docs/tendermint.pdf.

End-user or consumer marketplaces that use blockchain technology (e.g., many crypto-currencies) are decentralized to keep them free from undue influence by a single user, business, or governmental entity. This decentralization or distributed market is an incentive to many customers. Indeed, many such markets are intentionally designed to support anonymous, untrusted participants.

The combination of decentralization and support of anonymous—or more accurately pseudonymous—actors results in such markets and actors favoring permissionless validation systems (i.e., validation systems in which anyone can compete for the rewards without requiring anyone's permission to do so) because, by design, there is no central authority exercising hegemony over the system. Transactions are authenticated by having both parties authorize the transaction. This is typically accomplished by each party applying their respective digital signature, thereby establishing their respective authorization and consent to the transaction. In the context of blockchain systems, such consented-to transactions are then bundled into a block to be later appended to a blockchain which may be a "parent" blockchain.

Such systems then rely on anonymous validators (e.g., Bitcoin miners) to add these blocks to the blockchain using a consensus approach, such as proof-of-work calculations. This consensus approach to validate new blocks by anonymous, self-selected, permissionless miners is used by Bitcoin and was the original approach envisioned to ensure the integrity of transaction blocks added to the blockchain log or ledger. Such permissionless consensus systems typically follow the Bitcoin paper purportedly authored by Satoshi Nakamoto. See S. Nakamoto, "Bitcoin: A peer-to-peer electronic cash system," 2008.

One drawback to this consensus approach is that to induce people to become miners, a reward needs to be offered. Further, to limit the ability of any miner or group of miners to take over the system and add contaminated blocks to the blockchain, Bitcoin and other marketplaces institute a proof-of-work test for miners. The cost of passing the proof-of-work test is made to be sufficiently high or difficult, through for example, brute force calculations, that it can be prohibitively costly to create the multiplicity of validators necessary to overwhelm the system consensus and validate inappropriate transactions. At the same time, these marketplaces need to offer rewards valuable enough to induce miners to make the investments necessary to pass the proof-of-work tests. This results in the consensus approach being costly.

The approach also allows certain blocks to be rolled back. This "undoing" of certain blocks of the blockchain provides an additional level of assurance to the integrity of the overall blockchain, in case collusion is discovered in a validated block. But it further delays final validation of a transaction.

Other crypto-currencies seek to reduce the cost of validation by implementing different consensus techniques. The Ethereum platform seeks to implement a proof-of-stake procedure that does not create the computing challenge of proof-of-work, and does not require the costly expenditure of electricity to solve a difficult problem. While Ethereum rewards are smaller than those offered by Bitcoin, so are the costs of participation.

In comparison to an open currency, decentralized-type market like Bitcoin, enterprise marketplaces (e.g., financial market clearing systems) are typically centralized. They serve both anonymous and identified, but untrusting, participants. Because of their centralization, they can be served by a more cost-efficient permissioned ledger system. In such a permissioned system, a central authority vets and assigns the system validators, but the validation process remains distributed among these validators who still must achieve consensus to approve a transaction block. Rather than paying large rewards, these identified and vetted validators can be paid simple salaries. In addition, because the central authority has a higher level of trust in its permissioned agents, the validation process can be shortened and the chance or need for roll-back reduced. Because of its lower operating costs, many new permissioned applications are being developed using this alternate consensus approach. Such systems allow transactions by anonymous parties to be validated by identified validators. A vetting process and periodic audits by the central manager can further enhance collusion resistance. A description of such a permissioned solution has been authored by Jae Kwon, "Tendermint: Consensus Without Mining."

Other applications that seek the benefits of blockchain technology cover transactions by parties who already know each other and have reasons to trust one another (e.g., existing binding contracts or other legal infrastructure providing relatively predictable recourse). For such transactions, there is the opportunity to circumvent the consensus process altogether, and thereby further reduce operating costs. In addition, for transactions that include details of a highly confidential nature, just being able to avoid exposing transaction information to validators can be beneficial. To date, such an approach has not been posited. Thus, the opportunity is ripe for just such a system.

The subject disclosure targets this problem and opportunity. In a preferred embodiment, the described systems and methods provide applications in which transactions are conducted among participants who are known and trusted by each other (or, in the absence of a sufficient level of trust, the participants have sufficient recourse to rectify misrepresentation or misconduct by one or more parties). The disclosed systems and methods create an efficient automated, protocol-based system that assembles blocks to be added to the blockchain by following a computer-readable protocol to validate transactions, without requiring the intervention of numerous agents to arrive at a consensus.

A wide array of consensus models has been developed that attempt to address the issue of block validation. For purposes of the present invention, these various consensus models fall under two rubrics: permissionless and permissioned. As can be seen in Table 1 below, both systems can support anonymous (pseudonymous) and known users. Neither model requires that users trust one another. And both provide an incentive (e.g., reward or salary) for parties willing to participate in creating a consensus to validate the blocks of transactions that are appended to the blockchain.

TABLE 1

Comparison of methods for blockchain validation

| Consensus Model | User Type | User Trust | Collusion Resistance | Consensus Incentive |
|---|---|---|---|---|
| Permissionless | Anonymous | Untrusted | Proof of Work | Reward |
| Permissioned | Anonymous/ Known | Untrusted | Proof of Stake | Salary or other pay |
| Present Invention | Known | Trusted[1] | N/A | Not needed |

[1]Trusted implies either that each party is confident that (1) each counter party will fulfill its side of the transaction completely, or (2) there is sufficient legal or other recourse to redress any failure by a counter party to fulfill its obligations.

The incentives offered to consensus participants differ between the models. The permissionless system offers a high reward to justify the cost of competing to win the reward. On the other hand, the permissioned systems typically pay a fixed salary to known, vetted agents.

Certain examples of such systems have been designed and disclosed. One such method and system is disclosed in U.S. Pat. No. 9,569,771, for a Method and System For Storage and Retrieval of Blockchain Block Using Galois Fields, issued to Lesavich et al. (the "'771 patent" or "Lesavich et al."). The '771 patent discloses methods and systems for securely storing and retrieving one or more blocks for a blockchain using a modified Galois Fields on a cloud or peer-to-peer communications network. More particularly, the '771 patent appears to focus on the use of Galois Fields to enhance security for storing and retrieving electronic data on a cloud communications network. The '771 patent does not appear to disclose or suggest a method for automated, protocol-based validation of the integrity of transactions prior to appending records of the transactions to a block or directly to a parent blockchain.

Another example of a related system is described in U.S. patent application Ser. No. 15/086,801, for Systems and Methods of Blockchain Transaction Recordation, filed by Fay et al. (the "'801 application" or "Fay et al."). The '801 application teaches a computer system that communicates with a distributed blockchain computing system that includes multiple computing nodes. An apparent core element and step of the '801 application methodology is the monitoring process and generation of transactions dependent upon determining when two separate transactions are validated to form a recorded exchange of transactions (e.g., one transaction from A to B and another from B to A). If one of the parties fails to submit a transaction or the submitted transaction fails, then the computer system may generate a new blockchain transaction that revokes the other one of the two related transactions.

The '801 application accordingly appears to depend on a matching of separate transaction records. This creates several problems. First, each complete transaction requires a minimum of two component transactions. This requires additional processing time as well as causing the blockchain to grow larger and at a faster pace. Second, when an initial transaction needs to be nullified, the completed transaction requires the processing of, at least, four component transactions—further exacerbating the drain on both performance and scalability. Finally, the Fay et al. process does not provide a method or system for automatic, protocol-based validation of a completed transaction. By way of example, in Fay et al. where an initial transaction component may need to be reversed or undone, the process could not be handled automatically because it is impossible to have a protocol-based process anticipate all potential revisions.

Because the automated, protocol-based system of the present invention expects and relies on the condition that all of the transacting parties verify their confidence that the candidate transaction has taken or will take place, where these conditions are met, no consensus incentive is required to validate transactions. The pre-condition of confirmation by the parties to the transaction, and that the parties agree with the terms and conditions of the transaction as specified serves as sufficient validation of the underlying transaction.

SUMMARY OF THE INVENTION

The present invention overcomes the disadvantages of the prior art and fulfills the needs described above by providing systems and methods for validating the integrity of transactions before the recordation of the validated transactions into an electronic blockchain.

A preferred embodiment of the invention is a protocol-based method for validating the integrity of transactions before electronic recordation of said transactions is added to an electronic blockchain, the protocol comprising the steps of (a) obtaining a first confirmation from at least one first party to transfer an asset as part of a transaction that each said first party agrees with at least one term of said transaction; (b) obtaining a second confirmation from at least one second party to receive an asset as part of said transaction that each said second party has verified each said first party's respective agreement with at least one term of said transaction; (c) creating a validated electronic record of said transaction based upon receipt of said first and second confirmations; (d) adding said validated electronic record to a block of electronic transactions; and (e) adding said block of electronic transactions to said blockchain.

A further preferred embodiment of the invention is a method for validating the integrity of electronic records within a block before said block is added to an electronic blockchain using a protocol-based set of instructions, comprising the steps of (a) validating that all electronic recordations included in a block, where said electronic recordations relate to at least one condition of at least one underlying transaction, have been confirmed by at least one transferring party and at least one receiving party to said at least one underlying transaction; and (b) adding said validated block to said electronic blockchain.

A still further preferred embodiment of the invention is a computerized system computerized system for validating the integrity of electronic records of transactions before said records are added to an electronic block in an electronic blockchain, said system comprising (a) at least one computer server; (b) a plurality of terminals, each of said plurality of terminals being associated with a first and second plurality of parties each associated with a transaction; and (c) machine readable instructions stored on said at least one computer server, and said machine readable instructions when executed manages a blockchain data structure associated with said transaction and causes said at least one computer server to execute the steps of:

i. receiving a transaction specification from at least one of said plurality of first parties associated with said transaction;

ii. obtaining confirmation from said at least one of said plurality of second parties that said transaction specification is verified;

iii. sending an electronic data transmission request to each of said remaining plurality of terminals relating to said obtained confirmation of verification of said transaction specification;

iv. receiving from each of said remaining plurality of terminals associated with said plurality of parties' confirmations of verification of said transaction specification;

v. creating a validated electronic record of said transaction based upon receipt of said plurality of parties' verification confirmations;

vi. adding said validated electronic record to a block of transactions to be appended to said blockchain data structure; and vii. adding said block of transactions to said blockchain data structure.

BRIEF DESCRIPTION OF THE DRAWINGS

For the purposes of illustrating the invention, the attached drawings show certain aspects and embodiments that are presently preferred. However, it should be understood that the invention is not limited to the precise methodology or process steps or system elements as shown in the accompanying drawings, but rather is further disclosed and claimed according to the attached claims.

DETAILED DESCRIPTION OF CERTAIN
PREFERRED EMBODIMENTS

Innovative systems, processes, and methodologies for validating the accuracy of a transaction are disclosed and described through the following several preferred embodiments and exemplary uses. The disclosed system and the methodologies implemented in those systems have ready application to validating transactions, including electronic distributed ledger transactions, such as the tracking of the sale or transfer of an asset, whether a physical or intangible asset. Table 1 above illustrates an overview of the various elements and components relevant to validating a transaction between two or more parties.

Figure 1:
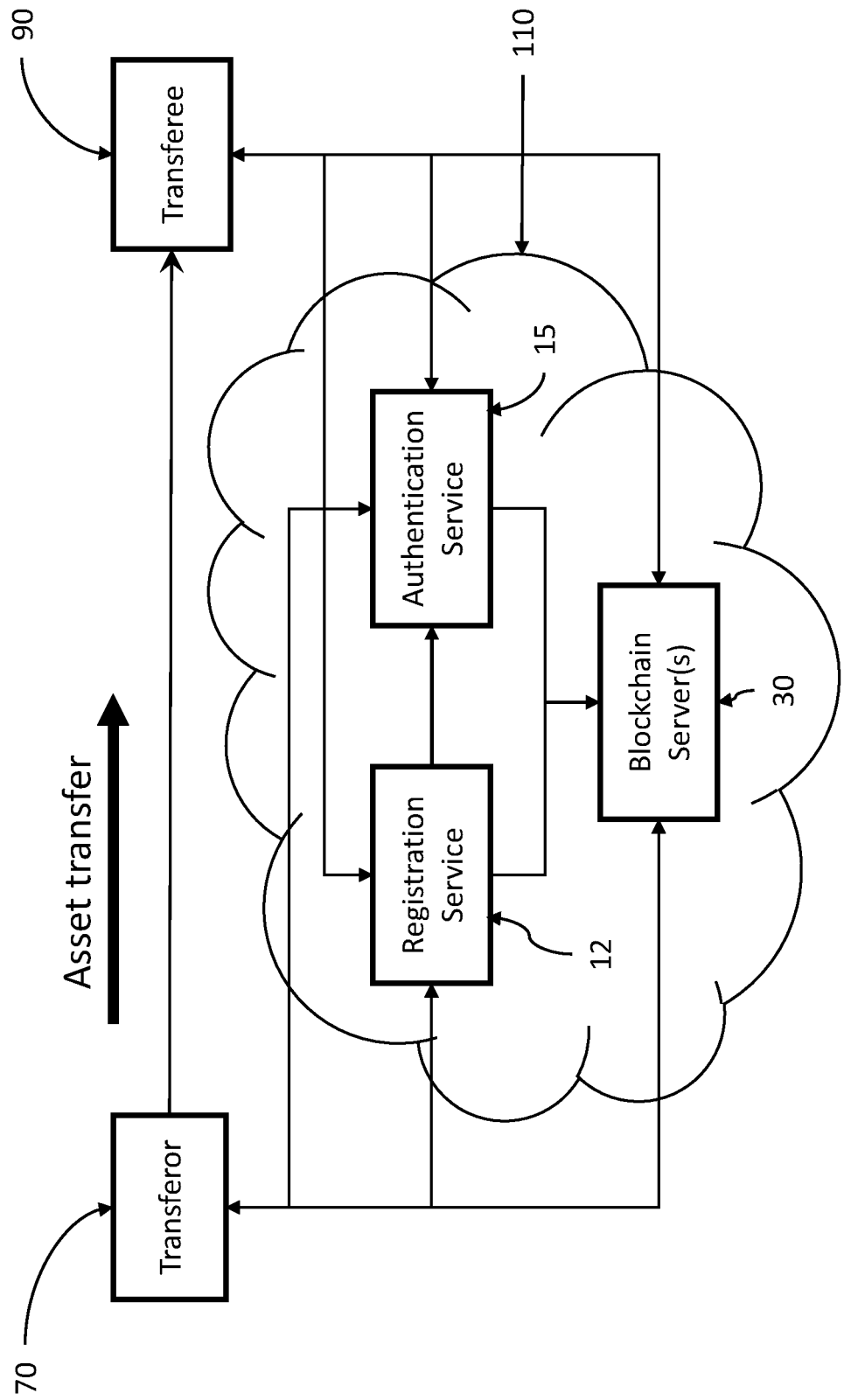
FIG. 1 is an overview system diagram showing the key participants and elements relevant to an exemplary embodiment of the inventive system for validating transactions to be maintained on an electronic blockchain.

Certain terms are used interchangeably herein to describe certain preferred embodiments of the inventive system, processes, and methodologies. The use of those terms as referencing particular embodiments or figures should not be construed as limiting the scope of the inventive methodologies or systems. At its core, an embodiment of the inventive methodologies and systems is illustrated in FIG. 1, showing relevant participants of a transferor (or seller) 70, a transferee (or recipient or buyer) 90, each with a computer terminal or computer input/output device, with each such device in communicative connection with a blockchain server 30 (maintained in the cloud 110). With respect to the participants, and by way of example, the term "seller" or "transferor" may include an entity exchanging an asset for cash or some other form of compensation, or may merely be transferring custody of an asset (such as legal evidence) to another entity. Similarly, the term "buyer" or "transferee" or "recipient" may include an entity purchasing an asset for cash or some other form of compensation, or may be receiving temporary or final custody of an asset (such as legal evidence) from another entity, including as an intermediary, such as a shipper or courier service.

Still further, the term "asset" is intended to broadly cover any product, material, device component, package, and/or physical or electronic document or file, including virtual assets such as data, electronic files, intangible assets (such as domain names, various intellectual property, trademarks, or copyrights), or even crypto-currencies. Further, the term "blockchain" is used herein to refer to any technology that allows for the creation of a non-repudiatable transaction record or ledger that is resistant to falsification.

A core or primary element of the innovative system is the use of a protocol-implemented methodology to verify (or confirm) aspects of a transaction between a transferor and recipient. In further detail, the methodology at its core entails (a) verification by a transferor of an asset about a term relating to the transaction, (b) verification by a recipient of an asset of the transferor verified term, (c) validation of the completed transaction based upon the parties' verifications prior to appending a record of the transaction to the blockchain. The disclosed process and underlying technology serves to create a non-repudiatable, and verifiable, electronic log of the transaction. The electronic log is confirmed/affirmed through use of secure identifiers provided to and maintained by each of the system users. By way of an example, the secure identifiers are used by each of the several asset custody holders whenever the custody holders create, transfer, or receive an asset. Such secure identifiers are also used by any other parties who may witness the transaction.

A preferred embodiment of this transaction-validation technology is particularly applicable and useful for electronic blockchain validation. By way of overview background, a blockchain is an electronic ledger of transactions. The blockchain or ledger "grows" as "completed" blocks, which correspond to new transactions (e.g., changes of custody or ownership) are added to the blockchain. The new transactions are grouped into blocks and the new blocks are then added or appended to the blockchain only after each new block undergoes a validation process. As described above, in current crypto-currency blockchain systems, the new block validations are undertaken by a consensus process that requires multiple agents, typically unrelated to the transaction, to reach a consensus on the accuracy of the transactions and blocks before they are added to the blockchain, which again may be a parent blockchain. In various embodiments, as disclosed herein, the block validation process is an automated, protocol-based process, thereby greatly reducing operating cost of the distributed ledger, and increasing the performance of the system (i.e., the number of transactions that can be processed in a given amount of time is greatly increased, and time required before a transaction can be validated may be substantially reduced).

Figure 2:
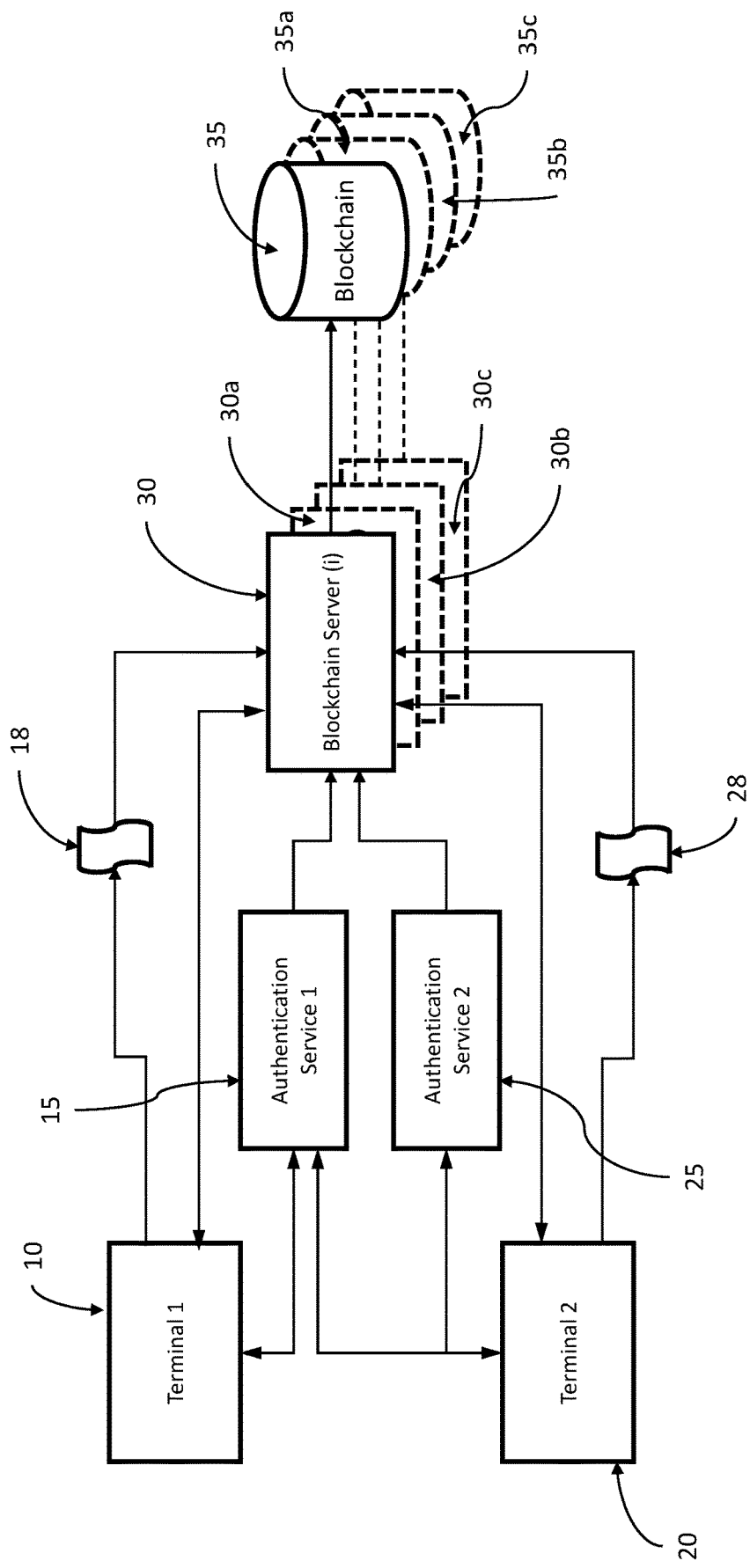
FIG. 2 is another system block diagram of an exemplary embodiment of the primary system elements and the communication flow within the inventive system.

FIG. 2 shows the basic functional components of an exemplary embodiment of the system in a sales transaction of an asset. The seller (e.g., a manufacturer) seeks to sell some of its products to a buyer (e.g., one of its regular distributors). Because the buyer is a regular distributor of the manufacturer, each of the transacting parties is known to the other. Given this knowledge, there is a level of trust between the two parties. More particularly, the parties have a historical relationship that provides both with a level of trust that the seller is willing to ship products to the buyer, and rely on the fact that the buyer will accurately verify receipt of the products shipped.

In the embodiment illustrated, the transferor uses terminal 10 to authenticate his identity through an authentication service 15 trusted by the transferee. Terminal 10 may be, by way of example a desktop computer, tablet computer, mobile phone, or any other similar type of computer input-output device. The authentication service 15 may be part of the offering of the blockchain provider or it may merely be an independent service accepted by both the transferee and the blockchain provider. The authentication service 15 then provides authentication to the blockchain server 30, which then affords the transferor access to the blockchain server 30.

The transferee, similarly, uses his terminal 20 to authenticate his identity through an authentication service 25. The transferee's authentication service 25 may be the same service as the transferor, or transferee's authentication service may be a different service that is accepted by the transferor and the blockchain provider. The authentication service for the transferee 25 provides its authentication to the blockchain server 30, thereby affording the transferee access to the blockchain server 30.

Next, when the transferor ships the specified assets, the transferor uploads a digitally signed transaction 18 (such as an invoice or bill of lading) to the blockchain server 30. The digital transaction 18 would include a listing of the products included in the transaction. Also included in the digital transaction 18 data is, at least, the name of the transferee(s) or the recipient of the products listed on the invoice. The blockchain server 30 then alerts the transferee that a transaction is awaiting validation. The digital transaction 18 is not necessarily transmitted to the transferee, but he or she is alerted to the recording of a transaction that the transferee can access by logging into the blockchain server 30 and view same digital transaction 18. In some embodiments, as illustrated in FIG. 2, the blockchain server 30 may consist of separate servers 30*a*, 30*b*, 30*c*, (1) to manage the transaction prior to adding it to a block, (2) to validate the transaction, (3) to add the validated transaction to a block, (4) to validate the block prior to appending it to the blockchain, and/or (5) add the validated block to the blockchain.

Next, the transferee reviews the identified and alerted transaction on the blockchain server 30. If the transferee agrees that the product(s) received match the products included in the digital transaction 18 specified by the transferor, the transferee then digitally uploads or signs a digital transaction 28 on the blockchain server 30. Upon the uploading or signing of the digital transaction 28 by the transferee, the transaction has been validated. More specifically, because both the transferee and transferor know each other, and/or have a sufficient level of trust of each other, upon receipt and recordation of confirmation that the products shipped are the same as the products received, as evidenced by the digital signatures of both transferor and transferee, there is no need for further independent validation or confirmation of the transaction. Accordingly, the transaction can then be added to a block to be appended to the blockchain 35, or the transaction may be directly appended to the blockchain 35.

Also shown in FIG. 2, the blockchain server 30 and the blockchain 35 may be replicated to allow for multiple copies of the blockchain server 30, 30*a*, 30*b*, 30*c* and multiple copies of the blockchain 35, 35*a*, 35*b*, 35*c* to allow for processing of each transaction concurrently in parallel. Such a redundant system architecture eliminates the problem that either component (the blockchain server 30 or blockchain 35) would be a single point of failure. For such a redundant system, an automated, protocol-based consensus algorithm would be implemented within each blockchain server 30 to compare results of the calculations, and to discard any calculations, or vote out any blockchain servers 30 that differ from the majority of the remaining blockchain servers 30. As known within redundant computer systems, the comparison and voting process is automated, protocol-based and does not require the intervention of separate or independent agents.

Alternatively, in a further embodiment of the inventive system, multiple independent blockchain servers could be implemented to handle distinct asset transactions, such as one blockchain for wine and another for handbags.

Figure 3:
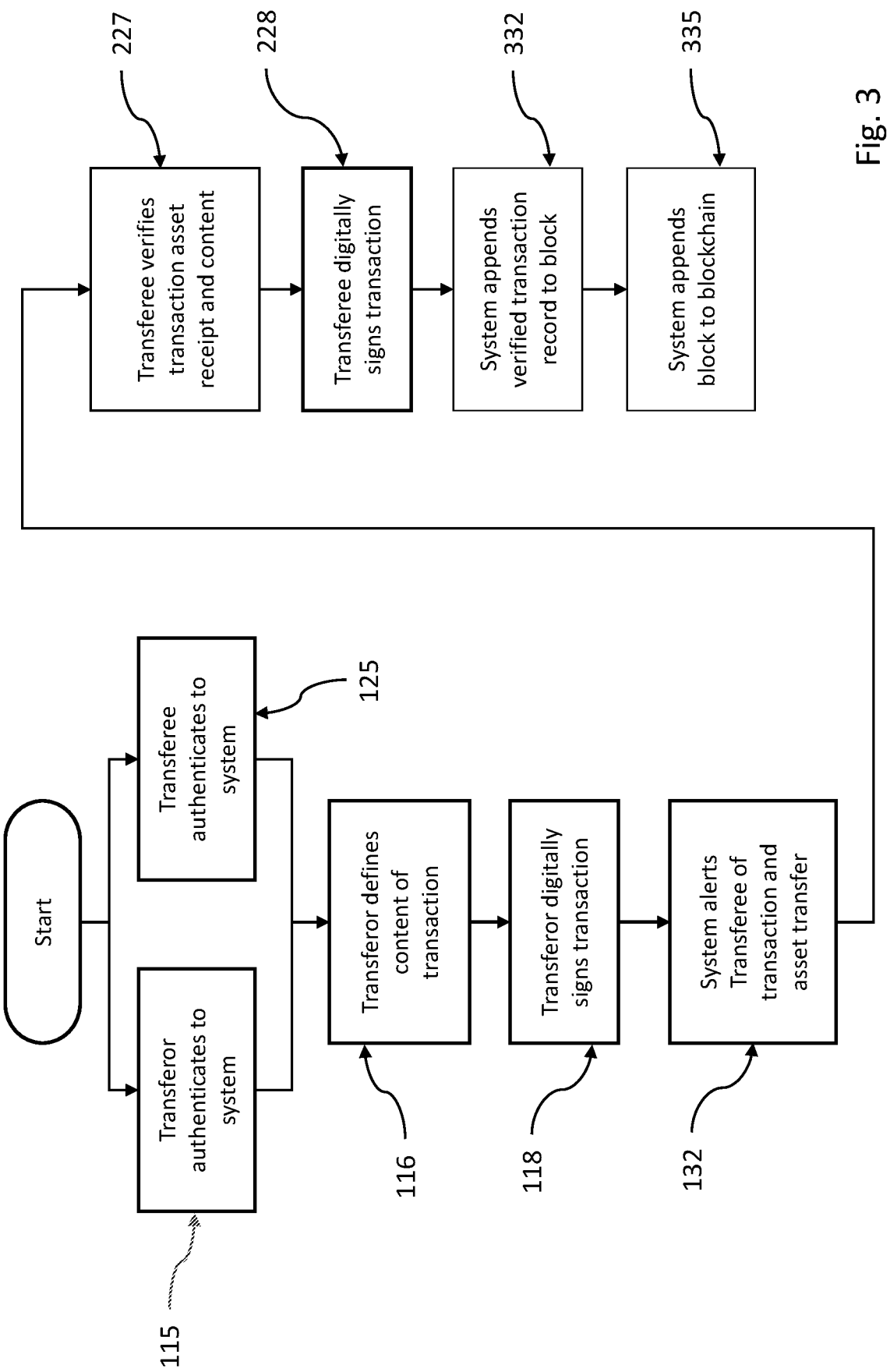
FIG. 3 is a system flowchart illustration of an exemplary embodiment of certain steps of the inventive methodology providing an example overview of the process flow.
Figure 4:
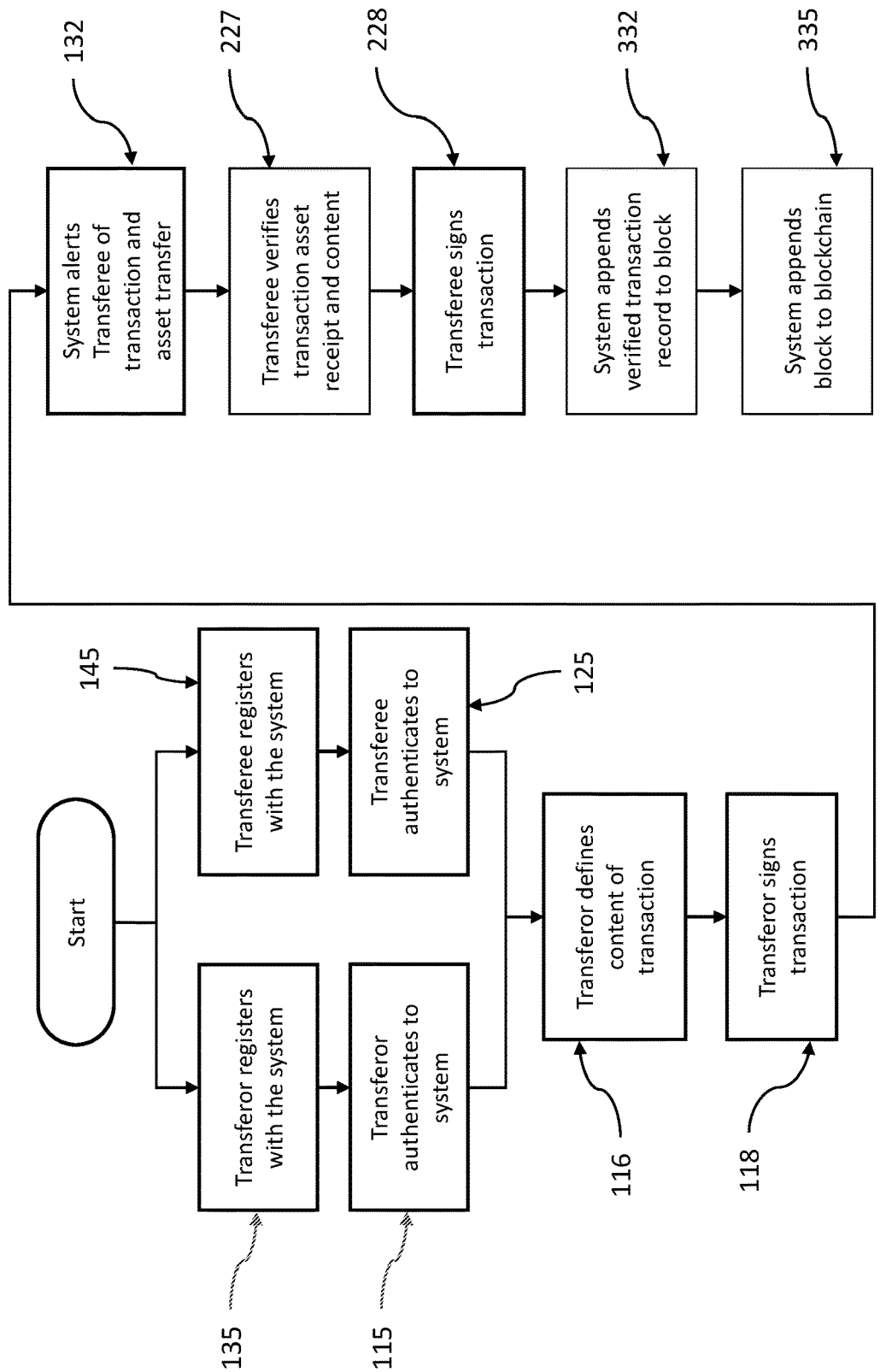
FIG. 4 is another system flowchart illustration of an exemplary embodiment of certain steps of the inventive methodology including registration of the transferors and transferee.

FIG. 3 depicts an exemplary embodiment of the process flow as disclosed above relating to FIG. 2. More particularly, the transferor authenticates 115 his identity to the system through the authentication server 15. The transferor then defines the contents of the transaction 116 and digitally signs the transaction 18 and uploads it to the blockchain server 30 to indicate that the transaction document 18 (e.g., an invoice) accurately reflects the products and/or services being provided to the transferee. The transferee also authenticates his identity to the system 125 either through a separate authentication service 25, or the same authentication service 125 used by the transferor. Further, in another embodiment of the system process, illustrated in FIG. 4, each of the transferors, if there are multiple transferors of elements of an asset to be transferred, registers 135 with the system, and likewise the transferee registers 145 with the system. Registration 135, 145 can occur using distinct registration services 12 or an agreed upon single registration service 12, as shown in FIG. 1.

The blockchain server 30 then alerts the transferee of a transaction awaiting his approval 132, and the transferee reviews and verifies 227 the transaction 18 details (e.g., comparing items received to items invoiced) on the blockchain server 30. If all is in order, the transferee appends 228 his digital signature to the transaction 28 on the blockchain server 30. Having received concurrence from both parties that the transaction is approved as specified, the blockchain server 30 is then able to add the transaction to a block 332, and then appends 335 the new block to the blockchain 35.

Not depicted in the above described example is the circumstance in which the transferee disputes the accuracy of the invoice 18. In such cases the transferee specifies the discrepancies with the transaction on the blockchain server 30. The blockchain server 30 provides an alert to the transferor that the identified discrepancies require review by at least the transferor.

At this stage, the transferor has several options. First, the transferor can modify the prior transaction 18 to address the discrepancies noted by the transferee and alerted by the blockchain server 30, and sign a new transaction 18a. In such a case, the original transaction 18 that was proffered by the transferor, but not approved by the transferee may be, but need not be, recorded in a data structure that may be within or part of the subject blockchain.

Alternatively, the transferor can negotiate the discrepancies with the transferee. If there is a negotiation between the transferor and transferee, and the transferee accepts the original transaction 18, then the transferee merely digitally signs the transaction 28. If, however the original transaction 18 is changed in any way, the transferor must sign the revised transaction 18a and obtain the transferee's signature before the recorded transaction 18a may be added to a new block. As noted above, in different embodiments, the blockchain server 30 may or may not keep track of, and record the history of negotiated or revised transactions before they are added to a block. For certain uses, a record or all negotiations and/or revised transaction information may need to be retained and recorded within the blockchain. However, for other uses, such detailed history, negotiation, and revised transaction information is of little use or import upon validation of the ultimate transaction. In different embodiments, either of these aspects can be readily implemented and achieved by the disclosed methodologies and systems. For example, to simplify and reduce the complexity and data storage requirements for the core blockchain, a separate ledger or record may be created and maintained for negotiation or transaction revision logs.

While preferred embodiments of the inventive system, processes, and methodologies have been described and disclosed, in particular with reference to certain figures and exemplary embodiments for validating the integrity of blockchain transactions prior to such transactions being added to the electronic blockchain using an automatic protocol-based methodology, such exemplary representations are not to be construed as limiting the scope of application of the inventive methodologies or systems. By way of example, the transaction-integrity validation systems described herein could be readily applied to other non-sale environments. The invention system has equal application to the transfer of assets, even where fees, compensation, or costs are not required to be transferred, for example for the transfer of evidence or other intangible assets. One example of such a transfer of evidence or an intangible asset is the recordation of a will, for example with the Register of Wills. Another exemplary application of the inventive system relates to usage with contracts or transactions where party obligations, responsibilities, and conduct may be automatically monitored and recorded, such as "smart contracts."

It will be recognized by those skilled in the art that other modifications, substitutions, and/or other applications are possible and such modifications, substitutions, and applications are within the true scope and spirit of the present invention. It is likewise understood that the attached claims are intended to cover all such modifications, substitutions, and/or applications.

What is claimed is:

1. A computer-implemented protocol-based method for improving efficiency and integrity of a blockchain through a protocol based, automatic block validation method, the method comprising the steps of:

importing authentication rules to at least one authentication blockchain node, for authenticating transaction entities associated with at least one transaction intended to be added to the blockchain;

importing verification rules to at least one verification blockchain node, for verifying integrity of at least one transaction intended to be added to the blockchain;

importing validation rules to at least one validation blockchain node, for creating and validating blocks to be added to the blockchain;

authenticating, by at least one authentication blockchain node, credentials of at least one first transaction entity, according to the authentication rules;

authenticating, by said at least one authentication blockchain node, credentials of at least one second transaction entity, according to the authentication rules;

receiving from at least one computer interface, by said at least one verification blockchain node, a transaction description created by said at least one first transaction entity, wherein said transaction description specifies parameters of at least one transaction intended to be added to said blockchain, according to the verification rules;

receiving from at least one computer interface, by said at least one verification blockchain node, a transaction confirmation created by said at least one second transaction entity;

verifying said at least one transaction, by said at least one verification blockchain node, upon receipt of said transaction confirmation from said at least one second transaction entity, wherein said verifying comprises:

a. verifying said authenticated credentials of said first and second transaction entities are parties to said transaction description;

b. automatically verifying said at least one transaction by either:

i. comparing said transaction description with said transaction confirmation to determine that said transaction description and said transaction confirmation describe the same transaction and agree on minimum transaction parameters according to the verification rules; or ii. determining said transaction confirmation approves said transaction description;
c. creating, by said at least one verification blockchain node, at least one verified transaction when said automatic verification occurs;
transmitting, by said at least one verification blockchain node, said at least one verified transaction to said at least one validation blockchain node;
automatically creating, by said at least one validation blockchain node, a validated block containing at least one verified transaction to be added to said blockchain, according to the rules; and
automatically appending, by said at least one validation blockchain node, said validated block of transactions to said blockchain.

2. The computer-implemented protocol-based method of claim 1, wherein said at least one transaction creates, publishes, moves, adds, changes, transfers or sells at least part of an asset.

3. The computer-implemented protocol-based method of claim 1, wherein said at least one transaction creates, publishes, adds, deletes, or modifies at least part of information, data, or a document.

4. The computer-implemented protocol-based method of claim 1, wherein at least one of said transaction description or said transaction confirmation is a digitally signed specification of said at least one transaction.

5. The computer-implemented protocol-based method of claim 1, wherein said at least one transaction is a creation of, purchase of, sale of, movement of, publication of, removal of, modification to, transfer of ownership of, transfer of custody of at least a part of a tangible or intangible asset, information, data, or record.

6. The computer-implemented protocol-based method of claim 1, wherein a record of any amendments to said at least one transaction, or a record of any data relating to said amendments are recorded as separate transactions from said at least one transaction.

7. The computer-implemented protocol-based method of claim 1, wherein said transaction description parameters include at least one of a description of products or services provided, a product or service number, price, quantity, payment terms, delivery terms, description of said transaction terms and conditions, and product or services source.

8. The computer-implemented protocol-based method of claim 1, further comprising the step of transmitting, by said at least one verification blockchain node, to said at least one computer interface, a request for confirmation of said transaction description from said at least one second transaction entity, wherein said request includes said specified parameters of said at least one transaction, and wherein said transmitting step occurs after receiving from at least one computer interface, a transaction description created by said at least one first transaction entity.

9. A system for improving efficiency and integrity of said blockchain operation through an automatic protocol based block validation, said system comprising:
a. at least one authentication blockchain node operatively connected to the blockchain;
b. at least one verification blockchain node operatively connected to the blockchain;
c. at least one validation blockchain node operatively connected to the blockchain;
d. at least one computer interface operatively coupled to at least one blockchain node;
e. a first set of machine-readable media containing instructions, wherein said first set of machine readable instructions when executed manage said blockchain;
f. a second set of machine-readable media containing authentication rules, for authenticating transaction entities associated with at least one transaction intended to be added to the blockchain;
g. a third set of machine-readable media containing verification rules, for verifying integrity of at least one transaction intended to be added to the blockchain;
h. a fourth set of machine-readable media containing validation rules, for creating and validating blocks to be added to the blockchain;
wherein said at least one authentication blockchain node, said at least one verification blockchain node, said at least one validation blockchain node, and said at least one computer interface execute an authentication, verification, and validation protocol for said blockchain, said system performing the steps of:
authenticating, by said at least one authentication blockchain node, credentials of at least one first transaction entity, according to the authentication rules;
authenticating, by said at least one authentication blockchain node, credentials of at least one second transaction entity, according to the authentication rules;
receiving from said at least one computer interface, by said at least one verification blockchain node, a transaction description created by said at least one first transaction entity, wherein said transaction description specifies parameters of at least one transaction intended to be added to said blockchain;
receiving, from said at least one computer interface, by said at least one verification blockchain node, a transaction confirmation created by said at least one second transaction entity;
verifying said at least one transaction, by said at least one verification blockchain node, upon receipt of said transaction confirmation from said at least one second transaction entity, wherein said verifying comprises:
a. verifying said authenticated credentials of said first and second transaction entities are parties to said transaction description;
b. automatically verifying, according to said verification rules, said at least one transaction by either:
i. comparing said transaction description with said transaction confirmation to determine that said transaction description and said transaction confirmation describe the same transaction and agreed on minimum transaction elements according to the verification rules; or
ii. determining said transaction confirmation approves said transaction description;
c. creating, according to said verification rules, by said at least one verification blockchain node, at least one verified transaction when said automatic verification occurs;
transmitting, by said at least one verification blockchain node, said at least one verified transaction to said at least one validation blockchain node;
automatically creating, by said at least one validation blockchain node, a validated block containing at least one verified transaction to be added to said blockchain, according to the validation rules; and
automatically appending, by said at least one validation blockchain node, said validated block-to said blockchain.

10. The system of claim 9, wherein at least two of said at least one blockchain node, said at least one verification blockchain node, said at least one authentication blockchain node, said at least one validation blockchain node, and said at least one computer interface are a unitary blockchain node.

11. The system of claim 9, wherein at least one of said transaction description and said transaction confirmation includes a digitally signed specification relating to said at least one transaction.

12. The system of claim 11, wherein said digitally signed specification is associated with at least a part of an asset transferred between said at least one first transaction entity and said at least one second transaction entity.

13. The system of claim 9, wherein said at least one transaction is a creation of, purchase of, sale of, movement of, publication of, removal of, modification to, transfer of ownership of, or transfer of custody or at least a part of a tangible or intangible asset, information, data, or record.

14. The system of claim 9, wherein said transaction description parameters include at least one of a description of products or services provided, a product or service number, price, quantity, payment terms, delivery terms, description of said transaction terms and conditions, and product or services source.

15. The system of claim 9, wherein said system further performs the step of transmitting, by said at least one verification blockchain node, to said at least one computer interface, a request for confirmation of said transaction description from said at least one second transaction entity, wherein said request includes said specified parameters of said at least one transaction, and wherein said transmitting step occurs after receiving from at least one computer interface, a transaction description created by said at least one first transaction entity.

* * * * *